US012338971B1

(12) United States Patent
Robertson et al.

(10) Patent No.: US 12,338,971 B1
(45) Date of Patent: Jun. 24, 2025

(54) EXTERIOR LAMPS WITH SYSTEM-BASED NATURAL TURBULATION AND ANTI-CONDENSATION

(71) Applicant: Ford Global Technologies, LLC, Dearborn, MI (US)

(72) Inventors: Michael Robertson, West Bloomfield, MI (US); Segundo Baldovino, Novi, MI (US); Aaron B. Johnson, Allen Park, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/810,696

(22) Filed: Aug. 21, 2024

(51) Int. Cl.
*F21S 45/20* (2018.01)

(52) U.S. Cl.
CPC .................................... *F21S 45/20* (2018.01)

(58) Field of Classification Search
CPC ............. F21S 45/20; F21S 45/33; F21S 45/60
USPC ......................................................... 362/547
See application file for complete search history.

(56) References Cited

U.S. PATENT DOCUMENTS 4,931,912 A * 6/1990 Kawakami .............. F21S 45/33 362/547
5,702,173 A 12/1997 Kawamura
6,045,248 A * 4/2000 Ashizawa ............... F21S 45/33 362/547
8,408,767 B2 4/2013 Hamid et al.
9,676,320 B2 * 6/2017 Lyon .................... B60Q 1/0035
9,679,320 B2 6/2017 Lyon et al.
2013/0070470 A1 3/2013 Yang

FOREIGN PATENT DOCUMENTS

CN 212057126 U 12/2020

* cited by examiner

*Primary Examiner* — Thomas M Sember
(74) *Attorney, Agent, or Firm* — Vichit Chea; Carlson, Gaskey & Olds, P.C.

(57) ABSTRACT

An assembly includes a lamp housing defining an interior cavity and at least one light component positioned within the interior cavity. At least one first turbulation feature is associated with the lamp housing and at least one second turbulation feature is associated with the at least one light component. The at least one first turbulation feature and the at least one second turbulation feature cooperate with each other to increase turbulent air flow within the interior cavity.

22 Claims, 3 Drawing Sheets

EXTERIOR LAMPS WITH SYSTEM-BASED NATURAL TURBULATION AND ANTI-CONDENSATION

TECHNICAL FIELD

This disclosure relates generally to an exterior lighting system for a vehicle, and more particularly to an exterior lighting system with turbulation features applied to multiple lamp components to induce greater natural turbulent air flow and reduce condensation.

BACKGROUND

Vehicles include exterior lighting systems with front and rear lamps that are configured to illuminate surrounding areas of the vehicle. These front and rear lamps may naturally experience moisture, heat, and condensation conditions.

SUMMARY

An assembly according to an exemplary aspect of the present disclosure includes, among other things: a lamp housing defining an interior cavity; at least one light component positioned within the interior cavity; at least one first turbulation feature associated with the lamp housing; and at least one second turbulation feature associated with the at least one light component, wherein the at least one first turbulation feature and the at least one second turbulation feature cooperate with each other to increase turbulent air flow within the interior cavity.

In a further non-limiting embodiment of any assembly, the at least one first turbulation feature comprises a plurality of first turbulation features.

In a further non-limiting embodiment of any assembly, the at least one second turbulation feature comprises a plurality of second turbulation features.

In a further non-limiting embodiment of any assembly, the at least one first turbulation feature comprises a plurality of first turbulation features, and wherein the at least one second turbulation feature comprises a plurality of second turbulation features.

In a further non-limiting embodiment of any assembly, the at least one first turbulation feature is formed on an outer surface of the at least one light component.

In a further non-limiting embodiment of any assembly, the at least one second turbulation feature is formed on an inner surface of the lamp housing and faces the at least one first turbulation feature.

In a further non-limiting embodiment of any assembly, the at least one first turbulation feature and/or the at least one second turbulation feature comprise at least one of an airfoil shape or a spiral staircase surface.

In a further non-limiting embodiment of any assembly, the at least one first turbulation feature and the at least one second turbulation feature are both completely enclosed within the lamp housing by a lens.

In a further non-limiting embodiment of any assembly, the lamp housing is positioned within a recess in a vehicle body component, and including at least one third turbulation feature associated with the vehicle body component and facing an external surface of the lamp housing.

In a further non-limiting embodiment of any assembly, the at least one third turbulation feature comprises a plurality of third turbulation features that are formed on an inner surface of the vehicle body component that faces an external surface of the lamp housing.

In a further non-limiting embodiment of any assembly, a lens encloses the at least one light component within the interior cavity of the lamp housing to form an external vehicle light assembly.

In a further non-limiting embodiment of any assembly, the external vehicle light assembly includes at least one vent patch.

In a further non-limiting embodiment of any assembly, the external vehicle light assembly includes at least one fan that cooperates with the at least one first turbulation feature and the at least one second turbulation feature to increase air circulation at the at least one vent patch.

In a further non-limiting embodiment of any assembly, the external vehicle light assembly comprises a head lamp or a tail lamp.

An assembly according to an exemplary aspect of the present disclosure includes, among other things: associating at least one first turbulation feature with a lamp housing; associating at least one second turbulation feature with at least one light component positioned within an interior cavity of the lamp housing; and positioning the at least one first turbulation feature and the at least one second turbulation feature relative to each other to increase turbulent air flow within the interior cavity.

In a further non-limiting embodiment of any method, the method includes forming the at least one first turbulation feature as a plurality of first turbulation features on an outer surface of the at least one light component, and forming the at least one second turbulation feature as a plurality of second turbulation features on an inner surface of the lamp housing that face the plurality of first turbulation features.

In a further non-limiting embodiment of any method, the method includes positioning the lamp housing within a recess in a vehicle body component, and associating at least one third turbulation feature with the vehicle body component that faces an external surface of the lamp housing.

In a further non-limiting embodiment of any method, the method includes forming the at least one third turbulation feature as a plurality of third turbulation features that are formed on an inner surface of the vehicle body component that faces the external surface of the lamp housing.

In a further non-limiting embodiment of any method, the method includes enclosing the at least one light component within the interior cavity of the lamp housing with a lens to form an external vehicle light assembly, and providing at least one vent patch on the external vehicle light assembly.

In a further non-limiting embodiment of any method, the method includes forming the at least one first turbulation feature and/or the at least one second turbulation feature to have at least one of an airfoil shape or a spiral staircase surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle exterior lighting system including components that cooperate with each other to induce greater natural turbulence as air flows in and out of a lamp housing through one or more vent patches.

Figure 1:
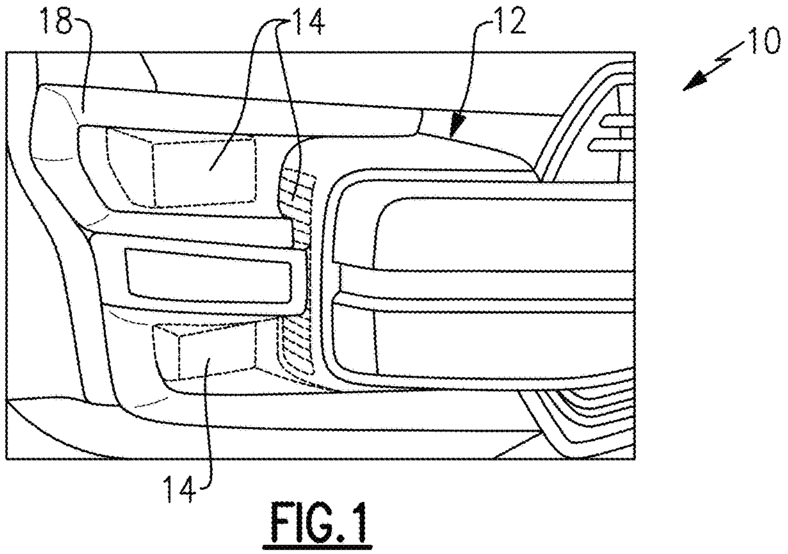
FIG. 1 illustrates a front view of an exterior light assembly on a front of a vehicle.
Figure 2:
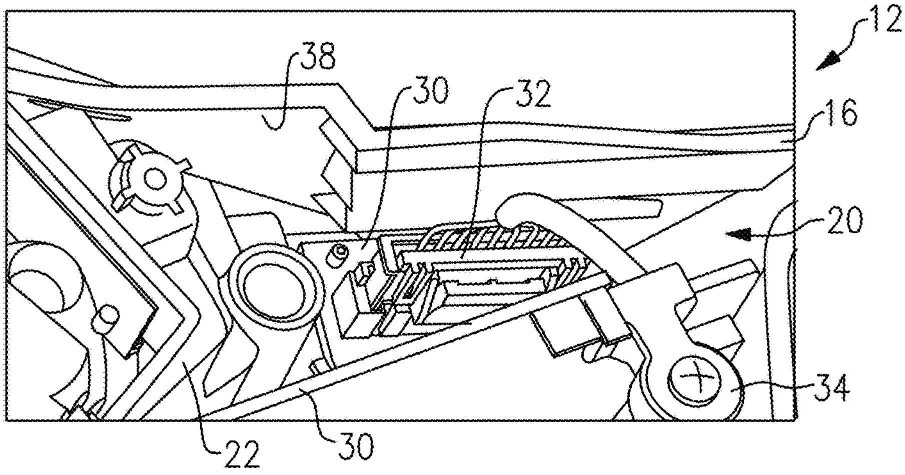
FIG. 2 is a top perspective view of an exterior light assembly with a lens removed.

With reference to FIGS. 1-2 a vehicle 10 includes an exterior light assembly 12 that has one or more light sources 14, e.g., LEDs, enclosed within a housing 16 (FIG. 2) by a lens 18. In implementations, the exterior light assembly 12 can comprise any front, side and/or rear lamp that is configured to illuminate surrounding areas of the vehicle 10. Conditions such as moisture, heat, and condensation, for example, are a natural occurrence for all types of exterior lamps. If not evaporated effectively, over time this condensation can adversely affect lamp performance and operation.

In certain situations, condensation can form due to an imbalance of external heat and internal heat of the lamp. Further, depending on the amount of condensation, such as large water droplets, this condensation may remain for several days. In implementations, fans may be added internally to move air around; however, this is disadvantageous from an expense and packaging aspect.

The subject disclosure provides a venting solution which performs well under many different types of conditions. In implementations, the disclosed venting solution is configured between internal lamp components and is optimized in relationship to an exterior lamp environment to provide optimal performance to alleviate condensation from forming.

In one example, the lamp housing 16 defines an interior cavity 20. At least one light component 22, e.g., one or more LEDs, is positioned within the interior cavity 20. In implementations, at least one first turbulation feature 24 (FIG. 3) is associated with the lamp housing 16 and at least one second turbulation feature 26 (FIG. 4) is associated with the at least one light component 22. The first turbulation feature 24 and the second turbulation feature 26 cooperate with each other to increase turbulent air flow within the interior cavity 20.

In implementations, the turbulation features 24 in the housing 16 combined with the turbulation features in the light component 22 work as a system in the light assembly 12 to generate natural turbulation between multiple components in the system. This eliminates the collection of heat and moisture, and reduces and/or eliminates condensation regardless of how a lamp is aimed. In the example shown in FIG. 1, the light component 22 comprises a reflector body; however, the light component 22 can be any type of light component in different types of light assemblies.

For example, as shown in FIG. 2, the light assembly 12 may also include a PCB 30 and associated electronics 32, as well as other fastening and connector components 34. Any of these additional components may include turbulation features 24. Other examples of light components 22 that could include turbulation features 24 include the outer lens, reflector surroundings, heat sinks, trim bezels, fog lights, reverse lights, etc. Additionally, turbulation features 26 associated with the lamp housing 16 may be formed at any location and on any surface of the housing 16.

Additionally, while FIG. 1 shows one example of an exterior light assembly 12, it should be understood that these features can be applied to all components in any lamp assembly, e.g., fog, CHMSL, front lamp, rear lamp, supplemental lamp, running board lamp, puddle lamp, and any other exterior lighting assembly that illuminates light.

Figure 3:
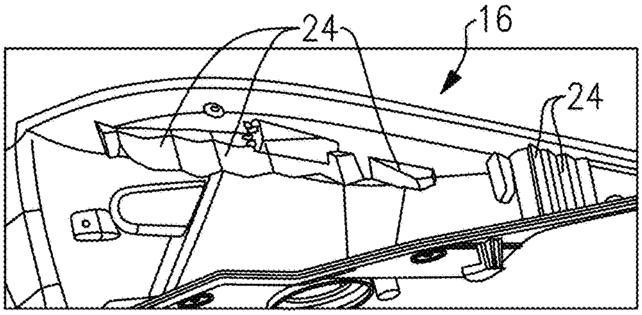
FIG. 3 is a top perspective view of a lamp housing of the exterior light assembly of FIG. 2.

As shown in FIG. 3, in implementations, the at least one first turbulation feature 24 comprises a plurality of first turbulation features 24. In one example, the first turbulation features 24 are formed on an outer surface 36 of the internal light component 22.

Figure 4:
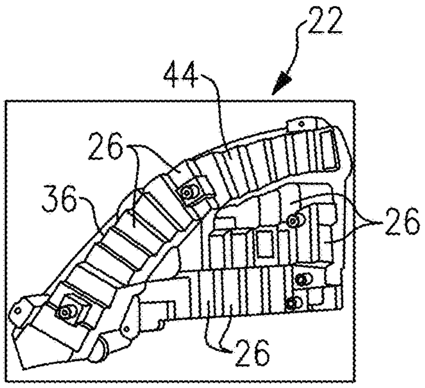
FIG. 4 is a perspective view of a reflector body of the exterior light assembly of FIG. 2.

As shown in FIG. 4, in implementations, the at least one second turbulation feature 26 comprises a plurality of second turbulation features 26. In one example, the second turbulation features 26 are formed on an inner surface 38 of the lamp housing 16.

Figure 5:
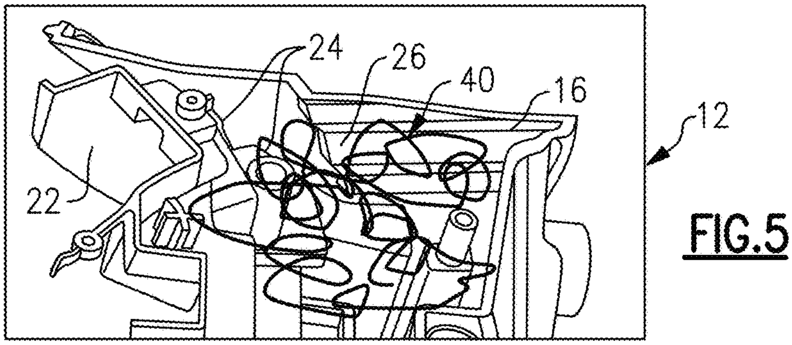
FIG. 5 schematically shows turbulent air flow created by the turbulation features inside of the lamp housing of the exterior light assembly of FIG. 2.

In implementations, the first turbulation features 24 and the second turbulation features 26 face each other as shown in FIG. 5. As a result, natural turbulation forms between the component 22 and housing 16 in the assembly 12 as indicated at 40.

In implementations, the at least one first turbulation feature 24 and/or the at least one second turbulation feature 26 comprise at least one of an airfoil shape 42 (FIG. 7) or a spiral staircase surface 44 (FIG. 4). Other shapes or contoured surfaces could also be used.

Figure 6:
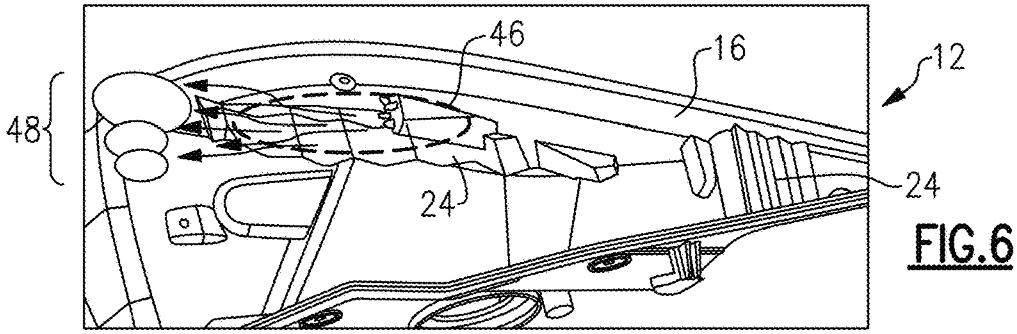
FIG. 6 is top perspective view of the lamp housing with turbulation features directing air flow to a condensation area.

FIG. 6 shows an example area 46 where molded in directional airfoil shapes 42 are implemented to target a condensation prone section 48 of the light assembly 12.

Figure 7:
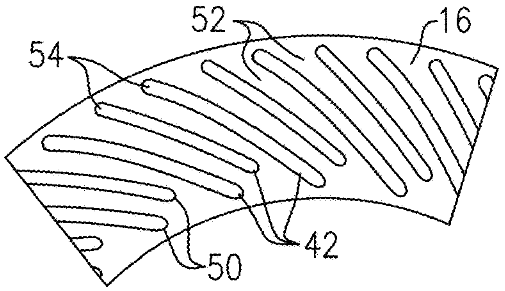
FIG. 7 is a top view of turbulation features comprising airfoil shapes.

In implementations, as shown in FIG. 7, the airfoil shapes 42 have curved leading edges 50. In implementations, the airfoil shapes 42 are separated from each other by channels 52. In one example, the channels 52 are narrower at the leading edges 50 and wider at trailing edges 54.

In implementations, when the lens 18 (FIG. 1) is fixed to the lamp housing 16, the first turbulation features 24 and the second turbulation features 26 are both completely enclosed within the lamp housing 16.

Figure 8:
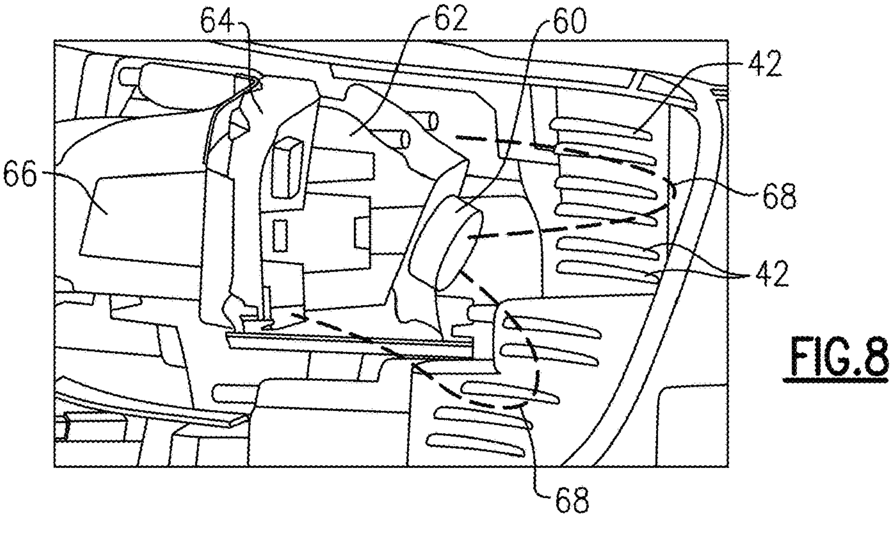
FIG. 8 is a perspective view of a light assembly with turbulation features and a cooling fan.

FIG. 8 shows an example of airfoil directed turbulation. In this example, a cooling fan 60 and associated air duct 62 are positioned within the internal cavity 20 of the lamp housing 16. A LED projector 64 and associated module 66 are also positioned within the cavity 20. In implementations, turbulation induced by the fan 60 cooperates with the airfoil shapes curved leading edge surfaces that direct airflow to a specific target location that is prone to condensation (see 68). However, natural turbulation without fan influence can also be directed by the molded airfoil shapes 42 to the condensation prone area.

Figure 9:
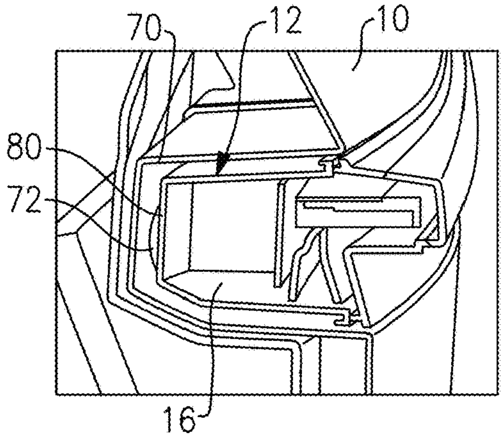
FIG. 9 is a section view of a lamp housing mounted within a body panel recess.
Figure 10:
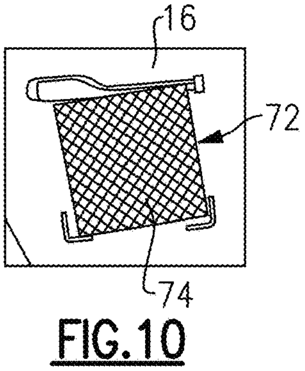
FIG. 10 is a top view of one example of a vent patch

In implementations, turbulation features may also be added to other components surrounding the outside of the light assembly 12. Often, a light assembly 12 may be packaged with very tight clearances to surrounding body panels other components. An example of this is shown in FIG. 9. This section view shows how a body panel component 70 is wrapped tightly around the lamp housing 16. In implementations, the external light assembly 12 includes one or more vent patches 72. In one example shown in FIG. 10, the vent patch 72 comprises a mesh or perforated strip/sheet of material 74 that covers a small opening in the lamp housing 16.

As shown in FIG. 9, the small clearances between the vent patch 72 on the lamp housing 16 and the body panel component 70 may restrict proper airflow and venting through the vent patch 72. Thus, in addition to features inside the lamp housing 16 for better airflow, the subject disclosure provides for features on an outside of the light assembly 12 so that airflow around the vent patch 72 increases.

Figure 11:
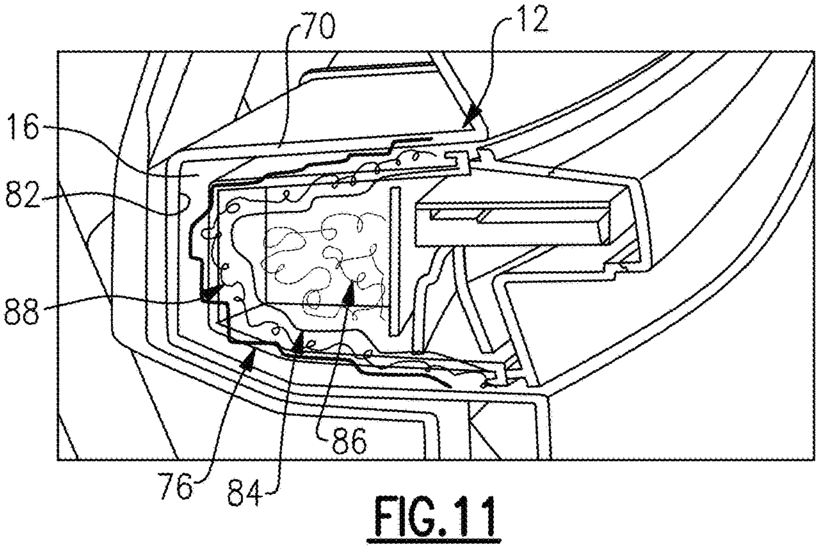
FIG. 11 is a view similar to FIG. 9 but showing the turbulation features and turbulent air flow areas.

FIG. 11 shows an example where turbulation features 76 are also added to the body panel component 70 surrounding the lamp housing 16. In this example, the lamp housing 16 is positioned within a recess 78 in a vehicle body component 70. The additional turbulation features 76 associated with the vehicle body component 70 face an external surface 80 of the lamp housing 16 and are formed on an internal surface 82 of the body component 70.

Figure 12:
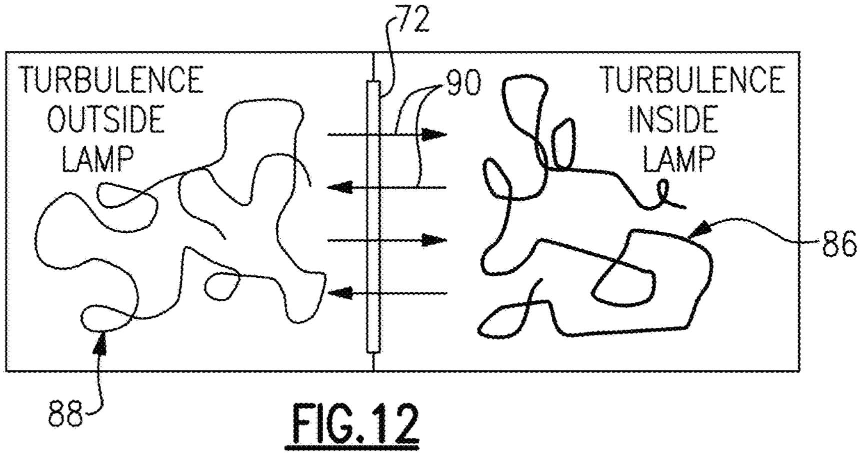
FIG. 12 is a schematic representation of turbulent air flow in relation to the vent patch.

FIG. 11 schematically shows the turbulation features 76, e.g. spiral staircase surface and/or airfoils, on the body component 70. The turbulation features inside the lamp housing 16 are schematically indicated at 84 and the turbulent air inside the lamp housing 16 is schematically indicated at 86. The turbulent air outside the lamp housing 16 is schematically indicated at 88. This configuration increases air circulation on both the inside and outside of the lamp housing 16 to further enhance venting properties. While still allowing for a tight package space, this gives a full lamp and vehicle system level approach for increasing air flow and condensation reduction. Doing this full system approach for inside and outside of the light assembly ensures that air movement 90 around the vent patch 72 is sufficient (see FIG. 12), allowing for proper moisture removal.

In the example shown in FIG. 11, the body component 70 comprises a moveable body panel; however, other body components could also include turbulation features. Other examples include body panel sheet metal, fender sheet metal, radiator structures, under hood trim covers, fascia cover and other vehicle panel structures, etc.

A method of creating turbulent air flow is also disclosed. In one example, the method includes: associating at least one first turbulation feature with a lamp housing; associating at least one second turbulation feature with at least one light component positioned within an interior cavity of the lamp housing; and positioning the at least one first turbulation feature and the at least one second turbulation feature relative to each other to increase turbulent air flow within the interior cavity.

The method may include any one of the following steps either alone or in any combination thereof.

In one example, the method may include forming the at least one first turbulation feature as a plurality of first turbulation features on an outer surface of the at least one light component, and forming the at least one second turbulation feature as a plurality of second turbulation features on an inner surface of the lamp housing that face the plurality of first turbulation features.

In one example, the method may include positioning the lamp housing within a recess in a vehicle body component, and associating at least one third turbulation feature with the vehicle body component that faces an external surface of the lamp housing.

In one example, the method may include forming the at least one third turbulation feature as a plurality of third turbulation features that are formed on an inner surface of the vehicle body component that faces the external surface of the lamp housing.

In one example, the method may include enclosing the at least one light component within the interior cavity of the lamp housing with a lens to form an external vehicle light assembly, and providing at least one vent patch on the external vehicle light assembly.

In one example, the method may include forming the at least one first turbulation feature and/or the at least one second turbulation feature to have at least one of an airfoil shape or a spiral staircase surface.

In implementations, computational fluid dynamic simulations may help determine where the turbulation features work best in the system while also determining the best location for venting holes/patches to eliminate build-up of heat and moisture before condensation forms. Examples of these system-based turbulation features comprise spiral staircase or airfoil features; however, other shapes or contoured surfaces could also be used.

In implementations, turbulation features are a custom defined feature that can be located to any portion of a component to offer flexibility in design. The features can be customized to change to any shape, design, angle and computational fluid dynamics can be used to simulate the system for natural turbulation findings for optimization.

In implementations, the position and orientation of turbulation features on reflector bodies, brackets, aiming mechanisms, housing, and/or other lamp components creates uneven surfaces forcing rising heat and moisture within the assembly system to promote natural turbulation. This eliminates the expense of fans and ducts and unwanted accumulation of heat and moisture by way of system-based naturally occurring turbulation.

Further, because the turbulation is system based between components in any head lamp, rear lamp, or fog lamp, the aiming of the components relative to the housing will only increase natural turbulation instead of being degraded when lamp aiming changes nominal conditions lamp-to-lamp in build variations.

The subject disclosure provides for turbulation features as a full system approach both inside the lamp housing and outside the lamp housing, with the option of also being paired with cooling fans. Given the flexibility of customizing the position and orientation of the turbulation features, the combinations of embodiments within a system between reflector bodies, brackets, aiming mechanisms, housings, inner lenses, carriers, etc., allow for endless combinations of design and embodiments to generate natural turbulence that is system induced, which forces rising heat and moisture within the assembly system to be eliminated by any combination of components.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly, comprising:

a lamp housing defining an interior cavity;

at least one light component positioned within the interior cavity;

at least one first turbulation feature associated with the lamp housing; and at least one second turbulation feature separate from the at least one first turbulation feature and associated with the at least one light component, wherein the at least one first turbulation feature and the at least one second turbulation feature face each other to increase turbulent air flow within the interior cavity.

2. The assembly of claim 1, wherein the at least one first turbulation feature comprises a plurality of first turbulation features.

3. The assembly of claim 1, wherein the at least one second turbulation feature comprises a plurality of second turbulation features.

4. The assembly of claim 1, wherein the at least one first turbulation feature comprises a plurality of first turbulation features, and wherein the at least one second turbulation feature comprises a plurality of second turbulation features.

5. The assembly of claim 1, wherein the at least one second turbulation feature is formed on an outer surface of the at least one light component.

6. The assembly of claim 5, wherein the at least one first turbulation feature is formed on an inner surface of the lamp housing and faces the at least one second turbulation feature.

7. The assembly of claim 1, wherein the at least one first turbulation feature and/or the at least one second turbulation feature comprise at least one of an airfoil shape or a spiral staircase surface.

8. The assembly of claim 1, wherein the at least one first turbulation feature and the at least one second turbulation feature are both completely enclosed within the lamp housing by a lens.

9. The assembly of claim 1, including a lens that encloses the at least one light component within the interior cavity of the lamp housing to form an external vehicle light assembly.

10. The assembly of claim 9, wherein the external vehicle light assembly includes at least one vent patch.

11. The assembly of claim 9, wherein the external vehicle light assembly comprises a head lamp or a tail lamp.

12. The assembly of claim 1, wherein the at least one light component comprises at least one of a LED, a reflector body, a lens, or other light source, and wherein the at least one second turbulation feature is formed on an outer surface of the at least one light component.

13. An assembly, comprising:

a lamp housing defining an interior cavity;

at least one light component positioned within the interior cavity;

at least one first turbulation feature associated with the lamp housing; and at least one second turbulation feature associated with the at least one light component, wherein the at least one first turbulation feature and the at least one second turbulation feature cooperate with each other to increase turbulent air flow within the interior cavity;

wherein the lamp housing is positioned within a recess in a vehicle body component, and including at least one third turbulation feature positioned outside of the interior cavity and associated with the vehicle body component, and the at least one third turbulation feature facing an external surface of the lamp housing.

14. The assembly of claim 13, wherein the at least one third turbulation feature comprises a plurality of third turbulation features that are formed on an inner surface of the vehicle body component that faces an external surface of the lamp housing.

15. An assembly, comprising:

a lamp housing defining an interior cavity;

at least one light component positioned within the interior cavity;

at least one first turbulation feature associated with the lamp housing;

at least one second turbulation feature associated with the at least one light component, wherein the at least one first turbulation feature and the at least one second turbulation feature cooperate with each other to increase turbulent air flow within the interior cavity;

a lens that encloses the at least one light component within the interior cavity of the lamp housing to form an external vehicle light assembly, and wherein the external vehicle light assembly includes at least one vent patch; and wherein the external vehicle light assembly includes at least one fan that cooperates with the at least one first turbulation feature and the at least one second turbulation feature to increase air circulation at the at least one vent patch.

16. A method comprising:

associating at least one first turbulation feature with a lamp housing;

associating at least one second turbulation feature with at least one light component positioned within an interior cavity of the lamp housing, wherein the at least one second turbulation feature is separate from the at least one first turbulation feature; and positioning the at least one first turbulation feature and the at least one second turbulation feature to face each other to increase turbulent air flow within the interior cavity.

17. The method of claim 16, wherein the at least one light component comprises at least one of a LED, a reflector body, a lens, or other light source, and including forming the at least one second turbulation feature as a plurality of second turbulation features on an outer surface of the at least one light component, and forming the at least one first turbulation feature as a plurality of first turbulation features on an inner surface of the lamp housing that face the plurality of second turbulation features.

18. The method of claim 16, including positioning the lamp housing within a recess in a vehicle body component, and positioning at least one third turbulation feature outside of the interior cavity and associating the at least one third turbulation feature with the vehicle body component such that the at least one third turbulation feature faces an external surface of the lamp housing.

19. The method of claim 18, including forming the at least one third turbulation feature as a plurality of third turbulation features that are formed on an inner surface of the vehicle body component that faces the external surface of the lamp housing.

20. The method of claim 16, including enclosing the at least one light component within the interior cavity of the lamp housing with a lens to form an external vehicle light assembly, and providing at least one vent patch on the external vehicle light assembly.

21. The method of claim 16, including forming the at least one first turbulation feature and/or the at least one second turbulation feature to have at least one of an airfoil shape or a spiral staircase surface.

22. The method of claim 16, including:

enclosing the at least one light component within the interior cavity of the lamp housing with a lens to form an external vehicle light assembly;

providing the external vehicle light assembly with at least one vent patch; and positioning at least one fan to cooperate with the at least one first turbulation feature and the at least one second turbulation feature to increase air circulation at the at least one vent patch.

* * * * *